May 6, 1958 J. LOVE 2,833,330
FLUID PRESSURE MECHANISM FOR SPIRALLY CORRUGATING TUBING
Filed April 19, 1955 2 Sheets-Sheet 1
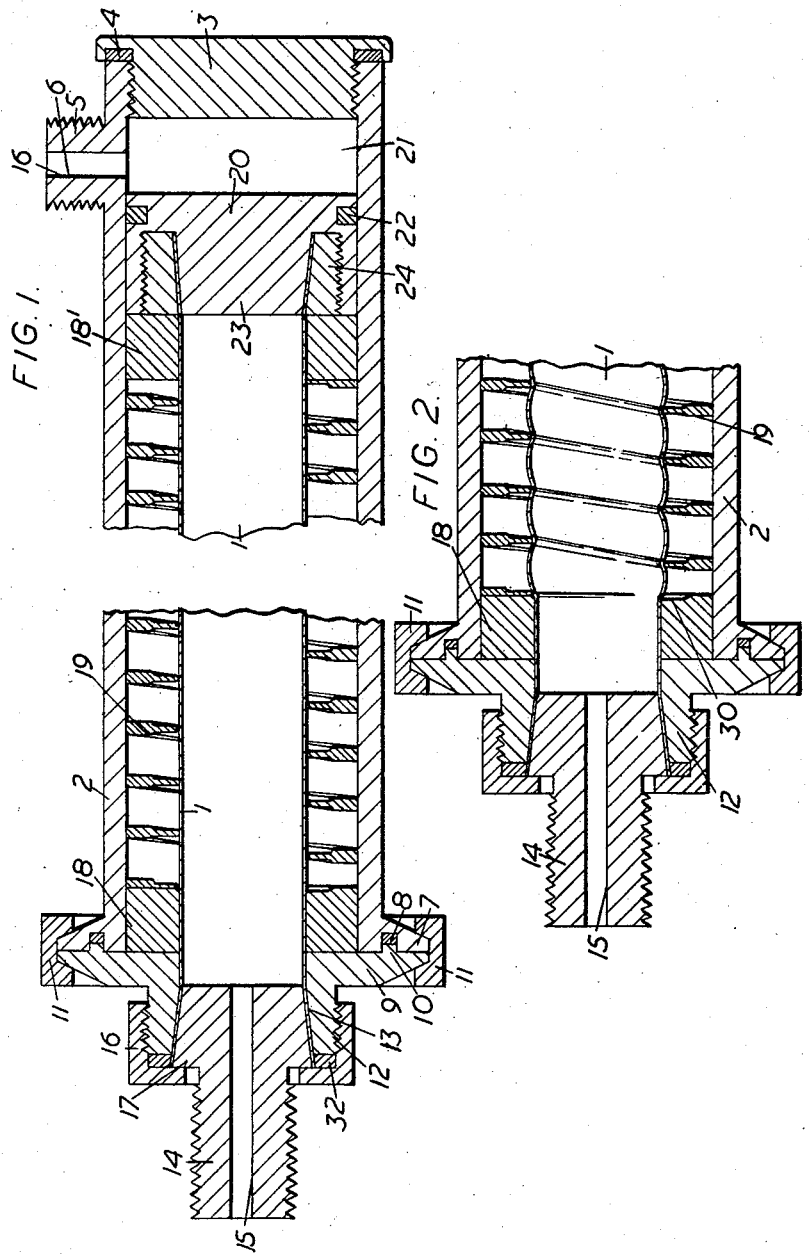
Inventor
John Love
By Tucker & Jucker
Attorney

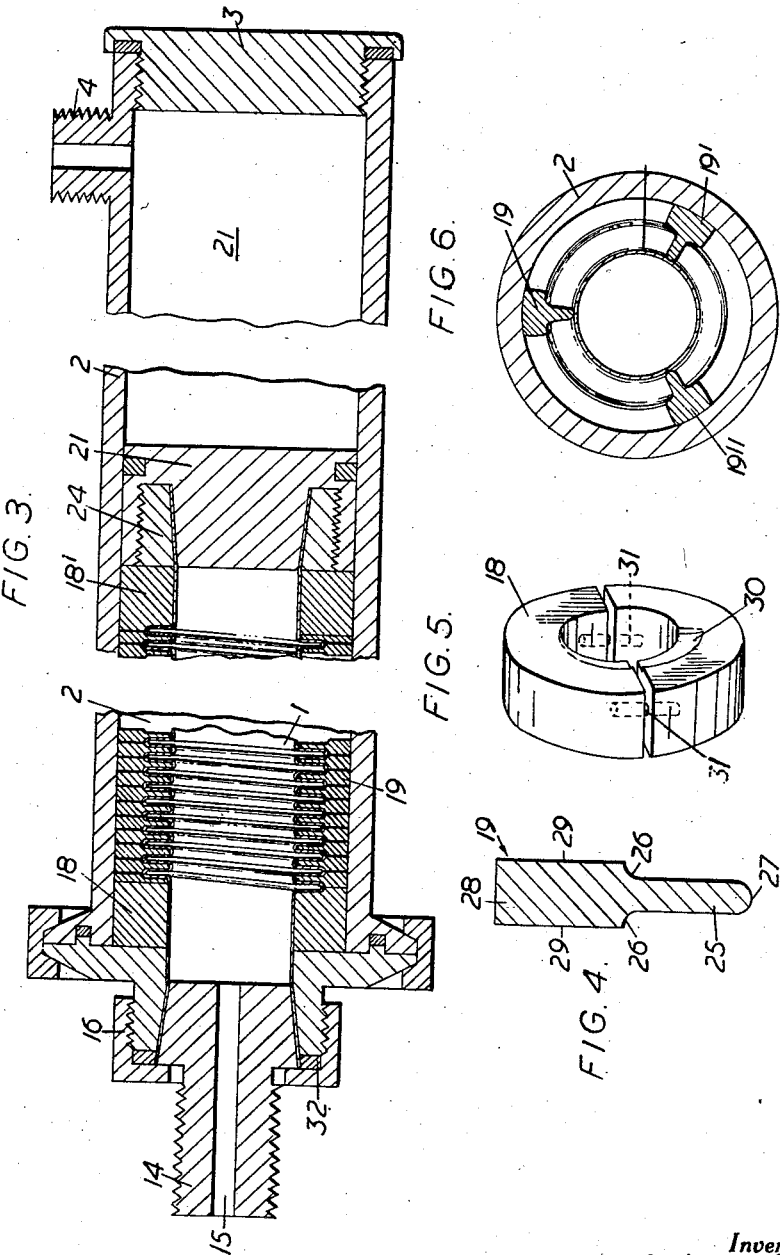

United States Patent Office 2,833,330
Patented May 6, 1958

2,833,330

FLUID PRESSURE MECHANISM FOR SPIRALLY CORRUGATING TUBING

John Love, Langside, Glasgow, Scotland, assignor to K. A. C. Limited, Glasgow, Scotland, a British company Application April 19, 1955, Serial No. 502,300

Claims priority, application Great Britain May 17, 1954

5 Claims. (Cl. 153—71)

This invention concerns improvements in or relating to the manufacture of metal tubing of helically corrugated form.

Although corrugated metal tubing may be formed with its corrugations formed annularly and at right angles to the axis of the tubing (such tubing usually being known as "bellows"), this invention concerns tubing having one or more helical corrugations and is more particularly applicable to the manufacture of short lengths of such tubing, although the invention could be used to produce long lengths of helically corrugated tubing.

It is known to produce lengths of corrugated bellows tubing by applying end pressure and simultaneous internal fluid pressure to a cylindrical length of tubing arranged in a sectional telescopic mould of which each section comprises a diametrically split apertured disc or washer initially maintained by spacers in a predetermined spaced relationship with the other washers. In this method the ends of the length of tubing to be corrugated are sealed and fluid is introduced through one of these sealed ends into the interior of the length of tubing to cause the tubing to expand between the said discs whereafter the spacers are removed (since the discs will now be maintained in spaced relationship by the expanded portions of the tubing) and endwise contracting pressure is applied to the length of tubing whilst maintaining the internal fluid pressure so that the tubing is axially contracted and the portions thereof intermediate the washers assume the form of bellows folds.

In an alternative prior proposal the need for the said spacers is obviated by clamping the split mould sections or washers on to the length of tubing.

In either case, the split mould sections used in the methods above described tend to mark the tubing where the two halves of the sections meet, and this marking is liable to produce a region of weakness and possible fracture when the tubing is subject to stress in use.

It is an object of this invention to provide a new or improved means for producing helically corrugated metal tubing wherein such marking is eliminated or reduced.

An object of this invention is to provide apparatus for helically corrugating metal tubing, comprising a cylindrical casing; a helical spring dimensioned for engagement with the outer surface of the tubing and the inner surface of the casing; means for sealing the first end of the tubing; a plug for insertion within the second end of the tubing; means for securing such plug within such end of the tubing and to the casing; a bore in such plug for passing pressure fluid to the interior of the tubing; and means for applying endwise pressure to said tubing and said spring; whereby the length of the tubing and the pitch of the spring are reduced as the fluid pressure forces the wall of the tubing between the coils of the spring.

The said casing forms a support for the said spring to aid the latter in resisting radial deformation by the fluid pressure acting thereon through the tubing. The spring should, of course, be strong enough to resist, at least to a great extent, the outward force of fluid pressure within the tubing so that undue friction is not developed between the spring and the casing.

According to a further but optional feature of this invention, the inner edge portions of said helical spring may be so shaped that when the spring is fully compressed they are still maintained separated from one another to accommodate the corrugations produced in the metal tubing, said inner edge portions of the spring imparting shape to such corrugations and the outer edge portions positively limiting the reduction in pitch of the spring.

Preferably the said helical spring is formed of a material having a moderately low modulus of elasticity; for example it may be made of brass.

This invention also includes corrugated metal tubing made by the method or in apparatus according to this invention. Further features of the invention will become apparent from the following description.

In order that the invention may more readily be understood, one embodiment of the same will now be described with reference to the accompanying drawings, in which:

Figure 1 is an axial section through apparatus for producing helically corrugated metal tubing;

Figure 2 is a section similar to Figure 1 and showing a stage in the production of such tubing;

Figure 3 is a section similar to Figure 1 and showing the final stage in the production of such tubing;

Figure 4 is a section through a spring seen in Figures 1 to 3 drawn to an enlarged scale;

Figure 5 is a perspective view of a collar shown in Figures 1 to 3; and

Figure 6 is a section at right angles to those of Figures 1 to 3 and illustrates the production of multi-start corrugations.

In the embodiment illustrated in the drawings, a length of thin seamless drawn cylindrical metal tubing 1 which is to be corrugated is mounted coaxially within an outer cylindrical casing 2. The said tubing 1 is conveniently less than .01" thick but may, if desired, be thicker, e. g. .02" thick, provided that the apparatus is capable of exerting the pressure necessary to corrugate such tubing.

One end of this casing 2 is closed by an end cap 3 which is screwed into the casing 2, a sealing ring 4 being interposed between the end cap 3 and the end of the casing to ensure a fluid tight joint between these parts. A screw-threaded nipple 5 having an axial bore 6 is provided in the casing 2 adjacent to the end cap 3 for a purpose which will hereinafter be apparent.

The other end of the casing 2 carries a conical flange 7 which is provided in its end face with an annular groove housing a sealing ring 8 and a collar 9 is adapted to mate with the end face of the flange 7, such collar being provided with an annular rib 10 adapted to enter the annular groove in the flange 7 and engage the sealing ring 8. The collar 9 is secured to the flange 7 by means of a clamping ring 11. The side of the collar 9 remote from the flange 7 carries an externally screw-threaded extension 12 which is co-axial with the casing 2, the inner surface 13 of this extension 12 being of conical form and diverging away from the casing 2. A plug 14, provided with a co-axial bore 15, is secured within the extension 12 by means of a lock nut 16 which screws on to the extension 12 and engages against a shoulder 17 on the plug 14, a sealing ring 32 being located between the lock nut 16 and the end of extension 12. The inner end of this plug is of conical form and is adapted to engage within the tubing 1 to clamp this tubing against the conical surface 13 of the collar 9. In this way the tubing is firmly secured to the casing at this end.

A split collar 18, which is shown in detail in Figure 5 and will be fully described hereinafter, closely surrounds the tubing 1 and abuts against the inner face of the collar 9, this split collar 18 being a close fit within the casing 2.

A helical spring 19 of a form to be hereinafter described is fitted co-axially over the length of tubing 1 closely encircling the latter and being itself closely encircled by the casing 2.

The other end of the tubing 1 is closed by a piston 20 which is a close but sliding fit within the casing 2 and is so located that a piston chamber 21 (to which the bore 6 in the nipple 5 gives access) is provided between the end face of the piston 20 and the end cap 3, such piston having a piston ring 22 to ensure sealing of the piston chamber 21. The piston 20 carries, on the side thereof remote from the end cap 3, a co-axial plug 23 which is of conical form converging towards the tubing 1 and the tubing is secured on the outer side of such plug by means of a retaining ring 24 screwing into the piston 20. A split collar 18' of form similar to the collar 18 is located on the side of the retaining ring 24 remote from the end cap 3.

The spring 19 is illustrated in cross-section in Figure 4 and the wire of which it is formed is in the shape of a rectangle having a narrow rounded projection 25 extending perpendicularly and symmetrically from one of its shorter sides, said projection 25 merging smoothly at 26 into said shorter side and having a length which is substantially equal to that of the rectangle. The cross-sectional shape of the wire, as shown in Figure 4, is thus similar to that of a butter pat such as is used for shaping butter. The helical spring 19 is formed by coiling wire of the cross-section above described in such a way that the projection 25 forms the inner edge portions of the spring so that, when the spring is fitted co-axially over the length of tubing as illustrated in Figures 1 to 3 the rounded ends 27 of the projection 25 bear on the outer surface of the tubing and the flat edge portions 28 of the rectangle bear on the inner surface of the casing 2. The sides 29 of the rectangle serve a purpose which will hereinafter be apparent. If desired the projection 25 may be narrower in the vicinity of the parts 26 than it is at its end 27, the precise shape depending on the desired form of the corrugations.

The method of manufacturing the helically corrugated tubing is to apply fluid pressure, e. g. hydraulic pressure, through the bore 15 in the plug 14 to the interior of the tubing and to increase such pressure until the yield point of the tubing is reached and it begins to collapse outwardly as shown in Figure 2. At the same time fluid pressure is applied to the piston chamber 21 via the bore 6 in the nipple 5 to counter-balance the effect on the inner face of plug 23 of the fluid pressure within the tubing 1. Thereafter the pressure in chamber 21 is slowly increased until the effective pressure slightly exceeds the pressure within the tubing 1 and the friction forces so as to cause the piston 20 to move axially within the casing 2 to collapse the tubing 1 and decrease the pitch of the spring 19. The final point is reached when the sides 29 of the rectangle of the spring 19 abut one another in the manner illustrated in Figure 3 and the tubing 1 then closely mates with the edges of the projection 25 of the wire as may be seen.

In order to eliminate the rather crude end corrugation which may be formed, the ends of the split collars 18 and 18' adjacent to the spring 19 are each provided with a groove 30 (seen in Figure 5) which is formed to taper off the corrugations in the tubing. The collars 18 and 18' are formed in two parts secured together by dowels 31 so as to enable these collars to be removed from the corrugated tubing after it has been formed.

After the corrugated tubing has been formed as above described, it is removed from the casing 2 by undoing the clamping ring 11 and withdrawing it from the casing. Whereafter, by unscrewing the lock nut 16, the plug 14 may be removed from one end of the tubing and in a similar manner the piston 20 may be removed from the other end of the tubing. Thereafter, the spring 19 may be screwed off the tubing or, if this is not possible, it may be removed in some other manner and if necessary discarded, it being relatively cheap and simple to provide such springs by mass production. In order to facilitate the removal of the spring 19, the outer surface of the tubing may, before it is corrugated, be given a thin coating of a wax, for example beeswax, so that, when the corrugations have been formed, this wax may be melted to give a slight clearance between the spring and the corrugations.

Although in the embodiment above described a single helical corrugation is formed in the tubing, it will be obvious that this method may be used to provide multistart corrugations of a greater helix angle or pitch by the use of two or more springs. For example, Figure 6 shows three springs 19, 19' and 19" which are equally spaced around the tubing 1 in order to provide a three-start corrugation.

The shape of the spring is conveniently that described but it may, of course, be of any other shape so as to produce corrugations of the profile and form desired. Thus, since the free pitch of the spring governs to some extent the depth of the convolutions in the tubing, it may be desirable to vary the depth of such convolutions, for example making them shallower at the ends and making them deeper in the middle of the length of tubing, the free pitch of the spring being smaller at the ends and greater in the middle to achieve this result.

Although in the above described embodiment the corrugations are symmetrical, that is to say the troughs and crests are of similar form, it is not necessary that this should be so. It will be appreciated that the shape of the projections 25 determines the form of the troughs whilst the width of the crests is determined by the difference in width between the projections and the rectangular portion of the wire. This difference may be reduced so as to be equal to or less than twice the thickness of the tubing and in this case the crests of the corrugations will be reduced to a form in which the two side walls of such crests abut, thereby to provide a length of tubing having a helical fin. If the intention is to produce helically finned tubing, the spring may, if desired, have a purely rectangular cross section whereby in the final construction the cross section of each crest will be rectangular and the two side walls of the crests will abut.

The effect of corrugating the tubing is, in the first place, to increase its effective surface area per unit of length and also normally to increase its flexibility, but the latter effect depends to some extent on the form of the corrugations.

I claim:

1. Apparatus for helically corrugating metal tubing comprising a cylindrical casing; a helical spring dimensioned for engagement with the outer surface of the tubing and the inner surface of the casing; means for sealing the first end of the tubing; a plug for insertion within the second end of the tubing; means for securing such plug within such end of the tubing and to the casing; a bore in such plug for passing pressure fluid to the interior of the tubing; and means for applying endwise pressure to said tubing and said spring; whereby the length of the tubing and the pitch of the spring are reduced as the fluid pressure forces the wall of the tubing between the coils of the spring.

2. Apparatus for helically corrugating metal tubing, comprising a cylindrical casing; a helical spring dimensioned for engagement with the outer surface of the tubing and the inner surface of the casing; piston means free to move within the casing and sealing the first end of the tubing; a plug for insertion within the second end of the tubing; means for securing such plug to the casing; a bore in such plug for passing pressure fluid to the interior of the tubing; and means for applying pressure fluid to such piston means to reduce the length of the tubing and the pitch of the spring.

3. Apparatus for helically corrugating metal tubing, comprising a cylindrical casing; a helical spring dimensioned for engagement with the outer surface of the tubing and the inner surface of the casing; abutment means on the spring positioned to interengage positively to limit the reduction in pitch of the spring; piston means free to move within the casing and sealing the first end of the tubing; a plug for insertion within the second end of the tubing; means for securing such plug to the casing; a bore in such plug for passing pressure fluid to the interior of the tubing to deform the wall thereof outwardly; and means for applying pressure fluid to such piston means to reduce the length of the tubing and the pitch of the spring.

4. Apparatus for helically corrugating metal tubing, comprising a cylindrical casing; a helical spring dimensioned to engage with the inner surface of the casing; inner edge portions on the spring positioned to engage the outer surface of the tubing and to impart shape to the corrugations of such tubing; outer edge portions on the spring forming abutments positioned to interengage positively to limit the reduction in pitch of the spring; piston means free to move within the casing and sealing the first end of the tubing; a plug for insertion within the second end of the tubing; means for securing such plug to the casing; a bore in such plug for passing pressure fluid to the interior of the tubing to deform the wall thereof outwardly; and means for applying pressure fluid to such piston means to reduce the length of the tubing and the pitch of the spring.

5. Apparatus for helically corrugating metal tubing, comprising a cylindrical casing; a helical spring made of a metal having a low modulus of elasticity and dimensioned to engage with the inner surface of the casing; inner edge portions on the spring positioned to engage the outer surface of the tubing and to impart shape to the corrugations of such tubing; outer edge portions on the spring forming abutments positioned to interengage positively to limit the reduction in pitch of the spring; piston means free to move within the casing and sealing the first end of the tubing; a plug for insertion within the second end of the tubing; means for securing such plug to the casing; a bore in such plug for passing pressure fluid to the interior of the tubing to deform the wall thereof outwardly; and means for applying pressure fluid to such piston means to reduce the length of the tubing and the pitch of the spring.

References Cited in the file of this patent
UNITED STATES PATENTS

| | | |
|---|---|---|
| 1,600,750 | Bezzenberger | Sept. 21, 1926 |
| 1,835,314 | Lord | Dec. 8, 1931 |
| 2,048,588 | Babcock | July 21, 1936 |
| 2,050,227 | Mantle | Aug. 4, 1936 |